United States Patent [19]
Wood

[11] 3,861,074
[45] Jan. 21, 1975

[54] LIGHTWEIGHT, DEEP-TROLLING RIG FOR FISHING TACKLE

[76] Inventor: William P. Wood, 5084 Northampton Ct., Newark, Calif. 94560

[22] Filed: July 2, 1973

[21] Appl. No.: 375,363

[52] U.S. Cl. ............................................. 43/43.12
[51] Int. Cl. ............................................. A01k 95/00
[58] Field of Search .................................. 43/43.12

[56] References Cited
UNITED STATES PATENTS

| | | | |
|---|---|---|---|
| 2,322,536 | 6/1943 | Miller | 43/43.12 |
| 2,749,649 | 6/1956 | Fitzsimmons | 43/43.12 |
| 2,994,622 | 8/1961 | Miller | 43/43.12 X |
| 3,391,482 | 7/1968 | Benoit | 43/43.12 |

Primary Examiner—Louis G. Mancene
Assistant Examiner—Daniel J. Leach
Attorney, Agent, or Firm—Phillips, Moore, Weissenberger, Lempio & Strabala

[57] ABSTRACT

A rig for use in fishing tackle ahead of the bait, which includes a sinker releasably coupled to a fishing line by a lightweight link. The sinker comprises an elongated body having a coupling member projecting from a side surface thereof, the coupling member having a portion extending perpendicularly therefrom. The link is formed with a receptacle to freely receive the portion of the coupling member therein and includes connection means for the fishing line at one end and for a leader having a baited hook thereon at the other end. The rig enables the bait to be trolled at increased depth at a given speed with fishing tackle of given weight and which automatically release the sinker when a fish is caught.

6 Claims, 4 Drawing Figures

PATENTED JAN 21 1975  3,861,074
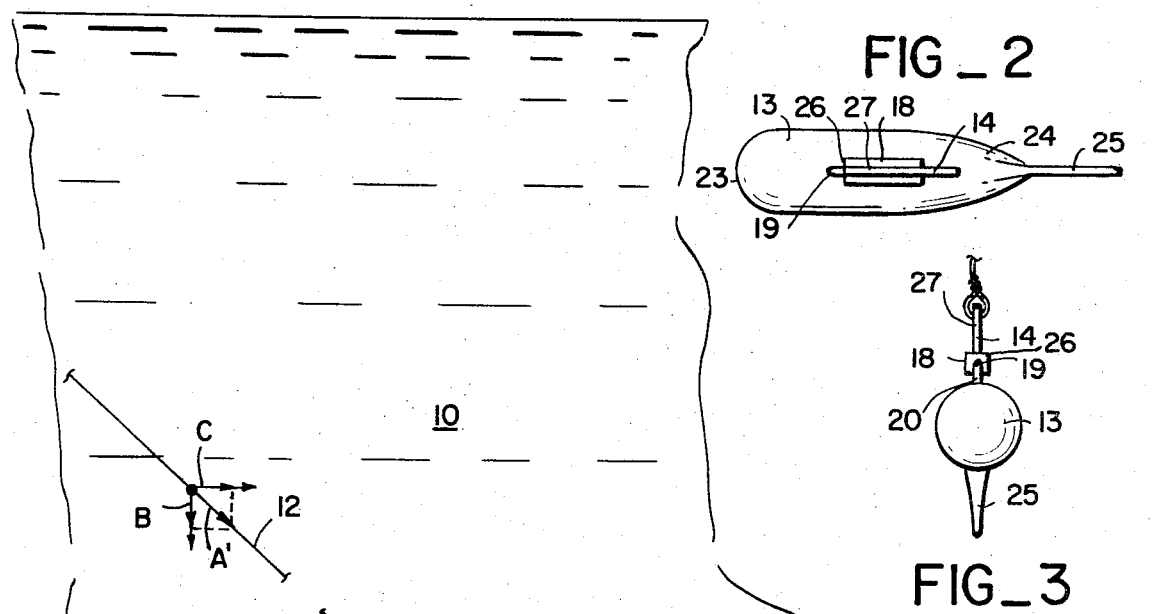
FIG. 2
FIG. 3
FIG. 1
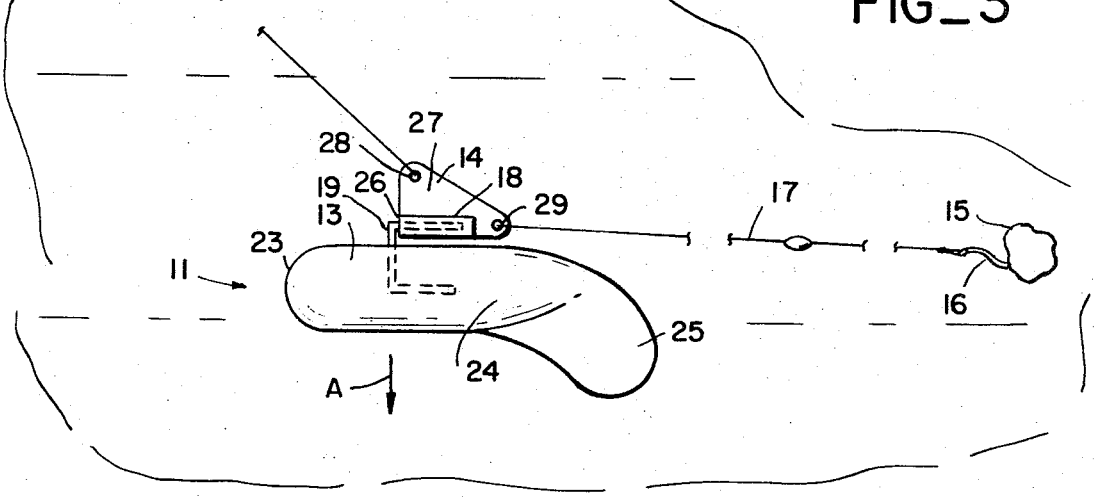
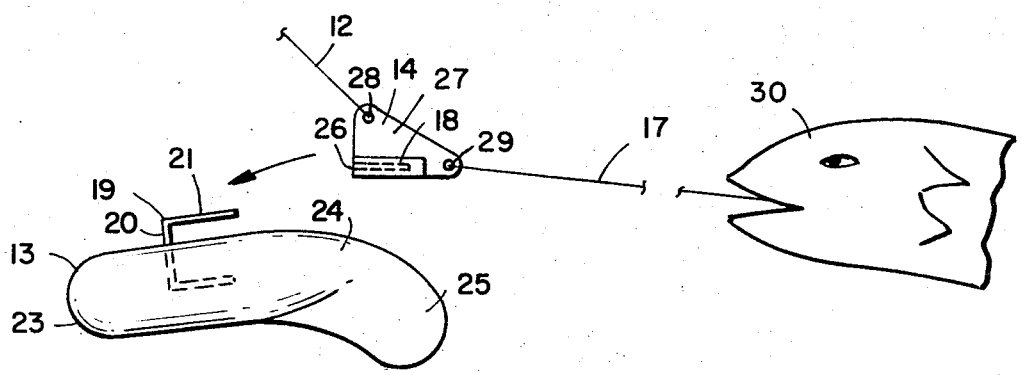
FIG. 4

LIGHTWEIGHT, DEEP-TROLLING RIG FOR FISHING TACKLE

BACKGROUND OF THE INVENTION

This invention relates to fishing tackle for use in trolling a bait and more particularly to a rig including a releasable sinker and a lightweight link designed to enable the bait to be trolled at an increased depth at a given speed with fishing tackle of a given weight and, at the same time, to enable the sinker to be automatically released when a fish is caught.

The depth at which the bait of fishing tackle of given weight may be trolled at a given speed is limited by the resistance offered by the bait and the line of the fishing tackle to trolling movement through the water. It will be understood that each increment of the length of the fishing line will offer a certain fixed amount of resistance to trolling movement through the water at a given speed. Since conventional fishing line and bait usually have a density only slightly greater than the density of water, they will tend to float to the surface of the water even if they are not being trolled and thus only a small amount of speed is sufficient to overcome any tendency of the fishing line and bait to sink due to the force of gravity. Thus, from time immemorial, it has been conventional to connect a weight or sinker, made of high-density material such as lead, to the fishing line with the bait. This will enable the bait to be trolled at a much greater depth for a given speed, although that depth remains limited for a sinker of given size and density by the resistance offered by the line, as well as the bait and sinker attached to the line, to movement through the water.

Obviously, the heavier the sinker used, the greater the trolling depth that may be reached. However, the strength of any given fishing tackle will impose an ultimate limit on the weight of the sinker that may be used therewith and thus on the trolling depth that may be attained with such fishing tackle. Furthermore, unless the sinker is released as soon as a fish is caught, the combined forces exerted on the tackle after the fish is caught will almost certainly exceed the strength of the tackle where a sinker heavy enough to approach the maximum trolling depth has been used.

Various mechanical devices for automatically releasing the sinker when a fish is caught have been proposed in the prior art. However, such devices tend to be unreliable in use as well as being complicated and expensive. Furthermore, a substantial amount of force must be exerted on the line in order to operate such devices reliably, and, in addition, such devices impose added weight and resistance to movement through the water. U.S. Pat. Nos. 2,562,054 and 2,830,400 disclose devices which are representative of the type of automatic sinker release devices known in the prior art. An even more unreliable device requiring a specific positioning of the release device after the fish is caught in order to release the sinker and which would appear to be useless for trolling purposes is taught in U.S. Pat. No. 2,884,735.

The net result of the prior art teachings described above is that heavy fishing tackle has been required to attain the deeper trolling depths at the usual trolling speeds. Thus, the fishing rod and reel as well as the fishing line have been made heavier in order to withstand the increased forces necessary to reach the deeper trolling depths. Obviously, the pleasure derived from catching certain of the smaller game fish which may be sought at the deeper trolling depths is reduced if it is necessary to use heavy fishing tackle. Also, this approach is self-defeating to the extent that the heavier the fishing line used, the greater is its resistance to being moved through the water at a given speed, thus requiring a heavier sinker to reach a given depth, which in turn tends to require heavier tackle, etc.

Another approach in the prior art has been to use a sinker member of lightweight material but designed in such a way that relative movement thereof with respect to the water causes it to descend in much the same way that a kite is caused to ascend by relative movement thereof with respect to the air. However, this approach relies on the direct application of tension forces to the fishing line in order to reach a trolling depth of any magnitude and thus requires the use of tackle just as heavy as, or heavier than, the approach first described above for a given trolling depth at a given speed.

It is an object of this invention to provide a fishing rig capable of reaching increased trolling depth at a given speed using fishing tackle of given weight.

It is a further object of this invention to provide a fishing rig which will enable greater trolling depths to be reached with lightweight fishing tackle.

It is another object of this invention to provide a releasable sinker trolling rig which is reliable in its operation and which does not require that any appreciable tensile forces be exerted on the fishing line by a caught fish in order to release the sinker thereof.

SUMMARY OF THE INVENTION

The deep-trolling rig according to this invention comprises a sinker releasably coupled to the line of fishing tackle ahead of the bait by means of a lightweight link, the sinker comprising an elongated body of high-density material and the link comprising a thin-walled receptacle means dimensioned to freely receive at least a rigid portion of the sinker. The link also includes means for connecting the line of the fishing tackle at the entrance end of the receptacle and for connecting the bait of the fishing tackle at the other end of the receptacle. The sinker and the receptacle means are structurally interrelated in such a way that the elongated body of the sinker is substantially balanced about its center of gravity when the sinker is in engagement with the receptacle means of the link and both are supported by the line of the fishing tackle.

BRIEF DESCRIPTION OF THE DRAWING

This invention will be more fully understood from a reading of the following detailed description of a preferred embodiment thereof in conjunction with the drawing wherein:

FIG. 1 is a side view in elevation of a preferred embodiment of the deep trolling rig of this invention represented in actual trolling use in the water with the line and bait of fishing tackle attached thereto.

FIG. 2 is a top view of the rig of FIG. 1 with the line and bait of the fishing tackle omitted.

FIG. 3 is a front view of the rig of FIG. 1 showing the line of the fishing tackle attached to the rig.

FIG. 4 is a side view similar to FIG. 1 but showing a caught fish at the time the hook of the fishing tackle is set and illustrating the release of the sinker from the rig.

DESCRIPTION OF PREFERRED EMBODIMENT

Referring to FIG. 1 a simplified representation of the major forces involved in trolling is represented by the arrows labeled A, A', B and C. The arrow labeled A represents the weight, in water 10, of the bait and sinker rig 11 attached to the line 12 of the fishing tackle. It will be understood that the weight in air of the rig 11 must be less than the test strength of the line 12 in order to enable the line 12 to support the rig 11 in air prior to deployment of the rig in water.

The arrow labeled A' represents the actual tension force exerted on an increment of the line 12 when the rig is being trolled in water 10. Such tension force will be generated not only by the weight A of the bait and sinker rig, in water, but also by the resistance offered by the rig 11 to movement through the water and the weight and resistance to movement through the water of each increment of the line 12 below the point at which such force is measured.

The arrow labeled C represents the component of the tension force A' contributed by the resistance of the rig 11 including the portion of the line 12 below a given point to movement through the water. The arrow labeled B represents the component of the tension force A' contributed by the weight in water of the rig 11 including the portion of the line 12 below a given point.

From the above it can be seen that, at a constant trolling speed, an increase in either the weight or the resistance to movement through the water of the bait and sinker rig 11 will result in increased tension force A' on the line thus requiring a heavier line 12 (i.e., a line of greater test strength) in order to withstand such tension force. A line 12 of greater test strength will tend to be larger and heavier thus increasing both component C and component B by offering greater resistance to movement through the water and adding weight below any given point in the line 12. This in turn will further increase the tension force A'. In addition, the increase in the component C will tend to cause the flexible line 12 to assume greater curvature in the water at a given trolling speed thus requiring more line 12 to reach a given depth which will again add to the components B and C and increase the tension force A'.

According to one aspect of the subject invention, the lightest possible line 12 is used for a given weight A, thus reducing the contribution of the line to the components B and C of the tension force A'. In addition, according to the teaching of this invention the contribution of the bait and sinker rig 11 to the component C is made as small as possible for a given weight A. It has been found that it is possible to reach greater depths at a given trolling speed using a light line 12 and a bait and sinker rig 11 according to this invention than was possible with much heavier line 12 when used with the bait and sinker rigs according to the prior art.

As shown in FIGS. 1 through 3, the bait and sinker rig 11 according to the teaching of this invention comprises a sinker 13 having an elongated body of high density material such as lead, for example. A lightweight link member 14 is attached to the line 12 and the bait 15, including the fishhook 16, is attached to the link member 14 by an appropriate leader 17 as is well known in the art.

The link member 14 comprises a receptacle means 18 adapted to receive at least a rigid portion 19 of the sinker 13. According to the teaching of this invention the relationship between the sinker 13 and the receptacle means 18 is such that the sinker 13 will be substantially balanced about its center of gravity when the sinker 13 is coupled to the link member 14 by engagement of the rigid portion 19 thereof with the receptacle means 18 and both are supported by the line 12.

As most clearly shown in FIGS. 3 and 4, according to this embodiment of the invention, the rigid portion 19 of the sinker 13 which engages the receptacle 18 of the link 14 comprises an elongated rod-like member having a first portion 20 which extends normally to the side surface of the elongated body of the sinker 13 and a second portion 21 which extends in a direction substantially parallel to the longitudinal axis of the elongated body of the sinker 13. The longitudinal axis of the first portion 20 of the rod-like member 19 preferably intersects the center of gravity of the elongated body of the sinker 13 although it may be spaced somewhat from such center of gravity along the longitudinal axis of the sinker 13 in the direction opposite from the direction in which the second portion 21 of such member 19 extends.

It will be understood that when the sinker 13 is trolled through the water, its longitudinal axis will tend to be maintained in a horizontal position parallel to the direction of motion due to the hydrodynamic effect of its elongated shape. The fact that the sinker 13 is substantially balanced about its center of gravity will tend to reduce the resistance offered by the sinker 13 to motion through the water. In addition, the leading end 23 of the elongated body of the sinker may be made spherical and the trailing end 24 of such elongated body may be streamlined to further reduce the resistance offered by the sinker 13 to motion through the water. Finally, the elongated body of the sinker 13 may be provided with at least one fin member 25 to assist in maintaining the longitudinal axis of the elongated body parallel to the direction of motion thereof through the water in order to insure that the sinker is always oriented properly to offer minimum resistance to such motion through the water.

It will be understood that the above described elongated shape of the sinker 13 makes it possible to increase the weight of the sinker 13 with little change in its resistance to motion through the water by simply making the body of the sinker 13 longer without increasing its cross-sectional dimensions. It is realized that the provision of surfaces more streamlined than the generally spherical surface 23 on the leading end of the sinker 13 might reduce the resistance of the sinker to motion through the water, but such surfaces would also tend to make the orientation of the sinker 13 less stable and I have found that a certain amount of such resistance is desirable in order to make the engagement between the sinker 13 and the link 14 less sensitive to minor snagging of the bait or jerking of the fishing tackle which may occur during trolling.

The engagement between the sinker 13 and the link 14 may take a wide variety of forms. For example, the link may be a lightweight receptacle dimensioned to freely receive a substantial portion of the elongated body of the sinker 13. At the other extreme the link 14 may merely provide an annulus or eyelet or even a slot-like passageway for freely receiving a rigid extension from the body of the sinker 13.

In the preferred embodiment shown in the drawing, the link 14 comprises a receptacle 18 providing an elongated passageway dimensioned to freely receive the full length of the second portion 21 of the coupling member 19. Such passageway may be open at both ends but the end thereof facing in the direction of motion of the rig 11 through the water will always be the entrance end so far as the coupling member 19 is concerned.

In this embodiment, the receptacle 18 is provided with a fin-like member 27 extending along the longitudinal axis of the passageway of the receptacle 18. As shown, such fin member 27 has the general shape of a right triangle with its base at the entrance end 26 of the receptacle 18 and its apex at the other end of the receptacle 18. A first aperture 28 is formed through the fin 27 in the base angle thereof spaced from the longitudinal axis of the passageway in the receptacle 18 and a second aperture 29 is formed through the fin 27 in the apex angle thereof at the longitudinal axis of the passageway in the receptacle 18. Thus, a line drawn through the centers of the apertures 28 and 29 will form an angle with respect to such longitudinal axis of the receptacle 18 and in the embodiment shown such angle is about 30°.

The first aperture 28 provides an appropriate means for attaching the link 14 to the line 12 and the second aperture 29 provides an appropriate means for attaching the leader 17, carrying the bait 15 and fishhook 16, to the link 14. Such attachment may be made in any manner conventional in the art but preferably includes the use of swivels as is well known.

The fin member 27 functions in the same way as the fin 25 in helping to maintain the longitudinal axis of the passageway in the receptacle 18, and thus the longitudinal axis of the sinker 13, parallel to the direction of motion through the water. In addition, the relative location of the apertures 28 and 29 with respect to the passageway of the receptacle 18 assists in releasing the engagement between the sinker 13 and the link 14 when a fish is caught.

Referring to FIG. 4, a caught fish 30 is shown at the instant the fishhook 16 is "set" in the mouth of the fish 30. It will be understood that the setting of the fishhook 16 in the mouth of the fish 30 must necessarily result in a radical decrease in the trolling motion of the fishhook 16, bait 15 and link 14. Since the sinker 13 has substantial mass and is free to continue its forward motion with respect to the link 14, the setting of the fishhook 16 will result in the disengagement of the sinker 13 from the link 14 as indicated. The setting of the fishhook 16 in the mouth of the fish 30 will also tend to cause the link to pivot in a counter clockwise direction about the point of attachment between the line 12 and the aperture 28. Such pivoting motion of the link 14 will also aid in releasing the engagement between the sinker 13 and the link 14 as illustrated. As a result, it has been found that very little, if any, additional tension on the line 12 is required to release the sinker 13 since the tension on the line imposed by the sinker 13 will begin to decrease as soon as the forward motion of the link 14 begins to stop in setting the fishhook 16.

The embodiment of this invention as shown in the drawing and described hereinabove has been tested in actual use. In such tests an eight pound test monofiliment nylon line 12 market every ten feet was used with an ordinary lightweight spinning rod. The sinker 13 used was about three inches long including the fin 25 and the main body portion thereof was about 5/8 inch in diameter. The sinker was made of cast lead and weighed about 6 ounces. The link 14 was made from a single piece of aluminum and machined to the relative size and shape shown in the drawing. The coupling member 19 was made from 1/16 inch diameter bronze wire shaped as shown in the drawing and cast in the sinker body in the position shown. The receptacle passageway 18 in the link 14, as well as the apertures 28 and 29, were 3/32 inch in diameter.

At normal trolling speeds of about three miles per hour the rig reached the bottom of the body of water at about 100 feet. It was found that the line assumed an angle of about 40° with respect to the horizontal at normal trolling speeds and that the curvature of the line 12 between the surface of the water and the rig 11 was small. For example, the depth of the rig 11 was sensed with a sonar type depth finder with 100 feet of line deployed while trolling at about 3 miles per hour. The depth finder repeatedly showed that the rig 11 was at a depth of about 60 feet.

As mentioned hereinabove variations may be made in the shape, size and coupling methods of the specific rig 11 shown and described above without departing from the teaching of this invention. It is expected that those skilled in the art will make such variations in the embodiment of this invention as shown and described herein in order to suit their own personal preferences.

What is claimed is:

1. A deep-trolling rig for use in the line of fishing tackle ahead of the bait thereof comprising a sinker releasably coupled to the line of said fishing tackle by a light-weight link, said sinker comprising an elongated body of high density material including a rigid coupling member comprising a first portion projecting normally from a side surface of said elongated body of high density material at a point substantially aligned with the center of gravity of said sinker and a second portion extending in a direction substantially parallel to the longitudinal axis of said elongated body of high density material; said link comprising a thin-walled receptacle means dimensioned to freely receive said second portion of said rigid coupling member of said sinker and including connecting means for connecting said line of said fishing tackle at the entrance end of said receptacle means and for connecting said bait of said fishing tackle at the other end of said receptacle means.

2. A deep-trolling rig as claimed in claim 1 wherein one end of said elongated body of high-density material has a generally spherical external surface and said second portion of said coupling member extends away from said one end of said elongated body.

3. A deep-trolling rig as claimed in claim 2 wherein said other end of said elongated body is provided with a fin extending along the axis of said elongated body.

4. A deep-trolling rig as claimed in claim 1 wherein said link member comprises an elongated receptacle having a passageway along its longitudinal axis for receiving said second portion of said coupling member and a fin-like connecting means extending along said longitudinal axis of said receptacle, said fin-like connecting means having an aperture therethrough at each of the opposite ends thereof.

5. A deep-trolling rig as claimed in claim 4 wherein said aperture through said fin-like connecting means at the end thereof adjacent the entrance end of said passageway of said receptacle is spaced from said longitudinal axis of said passageway and said aperture through said fin-like connecting means at the other end thereof is at said longitudinal axis of said passageway.

6. A deep-trolling rig as claimed in claim 5 wherein a line drawn through the centers of said apertures forms an angle of about thirty degrees with respect to said longitudinal axis of said passageway in said receptacle.

* * * * *